United States Patent [19]
LaJoie et al.

[11] Patent Number: 6,049,333
[45] Date of Patent: Apr. 11, 2000

[54] SYSTEM AND METHOD FOR PROVIDING AN EVENT DATABASE IN A TELECASTING SYSTEM

[75] Inventors: Michael L. LaJoie, Sherman Oaks; Joseph B. Edmonds, Santa Monica; Nizar Allibhoy, Northridge; Stephen M. Johnson, Burbank, all of Calif.; Anjan K. Ray, New York, N.Y.; Theodore F. Shaker, Jr., New Canaan, Conn.

[73] Assignee: Time Warner Entertainment Company, L.P., New York, N.Y.

[21] Appl. No.: 08/707,326

[22] Filed: Sep. 3, 1996

[51] Int. Cl.[7] ........................................ H04N 7/10
[52] U.S. Cl. ........................ 345/328; 345/438; 348/564
[58] Field of Search ..................... 345/348, 349, 345/356, 350, 351, 9, 157, 158, 145, 438; 348/13, 10, 734, 564, 906, 569, 552, 7

[56] References Cited

U.S. PATENT DOCUMENTS

| | | | |
|---|---|---|---|
| 3,899,662 | 8/1975 | Kreeger et al. | 345/438 |
| 4,203,130 | 5/1980 | Doumit et al. | |
| 4,635,202 | 1/1987 | Tsuji et al. | 345/438 |
| 4,706,121 | 11/1987 | Young | |

(List continued on next page.)

FOREIGN PATENT DOCUMENTS

| | | |
|---|---|---|
| 0 627 849 A1 | 12/1994 | European Pat. Off. |
| 0 725 538 A2 | 8/1996 | European Pat. Off. |
| 0 725 539 A2 | 8/1996 | European Pat. Off. |
| 0 758 833 A2 | 2/1997 | European Pat. Off. |
| 2 217 144 | 10/1989 | United Kingdom |
| 2 232 031 | 11/1990 | United Kingdom |
| WO 90/13204 | 11/1990 | WIPO |
| WO 95/28055 | 10/1995 | WIPO |
| WO 95/30302 | 11/1995 | WIPO |
| WO 95/31069 | 11/1995 | WIPO |
| WO 95/32583 | 11/1995 | WIPO |
| WO 95/32587 | 11/1995 | WIPO |
| WO 96/09721 | 3/1996 | WIPO |
| WO 96/41472 | 12/1996 | WIPO |

OTHER PUBLICATIONS

"Multiplying Video Mixer," NTIS Tech Notes, p. 135, Feb. 1990.

Vito Brugliera, "Digital On–Screen Display: A New Technology for the Consumer Interface," Symposium Record, Cable Sessions, 18th International Television Symposium and Technical Exhibition, Montreux, Switzerland, pp. 571–586, Jun. 10–15, 1993.

Matthew D. Miller, "A Scenario for the Deployment of Interactive Multimedia Cable Television Systems in the United States in the 1990's," Proceedings of the IEEE, vol. 82, No. 4, pp. 585–589, Apr. 1994.

*Primary Examiner*—Victor R. Kostak
*Attorney, Agent, or Firm*—Fish & Neave; Laurence S. Rogers; Garry J. Tuma

[57] ABSTRACT

A system and method are provided for presenting on a television, a combined display of information contained in an event database and television program video content. A set-top terminal receives as input, television program video content signals and information comprising an event database. The set-top terminal converts the information from the event database into a graphical format for display on a television with the television program video content. Updates to the event database are processed and displayed substantially in real-time. The event database may include information for televised events. The set-top terminal automatically tunes, at the viewer's request, to the event for which information is being displayed. Improved processes for combining television program video content and locally generated graphical images are also provided.

51 Claims, 11 Drawing Sheets

U.S. PATENT DOCUMENTS

| | | |
|---|---|---|
| 4,751,578 | 6/1988 | Reiter et al. . |
| 4,896,347 | 1/1990 | Auber . |
| 4,991,011 | 2/1991 | Johnson et al. . |
| 5,038,211 | 8/1991 | Hallenbeck . |
| 5,047,867 | 9/1991 | Strubbe et al. . |
| 5,121,476 | 6/1992 | Yee . |
| 5,223,924 | 6/1993 | Strubbe . |
| 5,253,066 | 10/1993 | Vogel ................................. 348/564 |
| 5,301,028 | 4/1994 | Banker et al. . |
| 5,353,121 | 10/1994 | Young et al. . |
| 5,412,720 | 5/1995 | Hoarty . |
| 5,434,626 | 7/1995 | Hayashi et al. . |
| 5,459,522 | 10/1995 | Pint . |
| 5,477,262 | 12/1995 | Banker et al. . |
| 5,479,266 | 12/1995 | Young et al. . |
| 5,479,268 | 12/1995 | Young et al. . |
| 5,485,221 | 1/1996 | Banker et al. . |
| 5,502,504 | 3/1996 | Marshall et al. . |
| 5,513,309 | 4/1996 | Meier et al. ........................ 345/438 |
| 5,515,106 | 5/1996 | Chaney et al. . |
| 5,528,304 | 6/1996 | Cherrick et al. . |
| 5,532,754 | 7/1996 | Young et al. . |
| 5,539,478 | 7/1996 | Bertran et al. ..................... 345/158 |
| 5,550,576 | 8/1996 | Klosterman . |
| 5,559,548 | 9/1996 | Davis et al. . |
| 5,561,709 | 10/1996 | Remillard .......................... 348/552 |
| 5,576,755 | 11/1996 | Davis et al. . |
| 5,585,866 | 12/1996 | Miller et al. . |
| 5,589,892 | 12/1996 | Knee et al. . |
| 5,594,509 | 1/1997 | Florin et al. . |
| 5,614,940 | 3/1997 | Cobbley et al. ................... 348/906 |
| 5,619,274 | 4/1997 | Roop et al. . |
| 5,625,406 | 4/1997 | Newberry et al. . |
| 5,629,733 | 5/1997 | Youman et al. .................... 348/13 |
| 5,635,978 | 6/1997 | Alten et al. . |
| 5,640,499 | 6/1997 | Nagai ................................. 345/438 |
| 5,670,955 | 9/1997 | Thorne, III et al. ............... 345/157 |
| 5,751,283 | 5/1998 | Smith ................................. 348/438 |

SYSTEM AND METHOD FOR PROVIDING AN EVENT DATABASE IN A TELECASTING SYSTEM

BACKGROUND OF THE INVENTION

This invention relates generally to telecasting systems and particularly to telecasting systems that transmit digital data which may be used to provide interactive applications for use by television viewers. More particularly, this invention is directed toward a system and method that use digital data transmitted in a telecasting system to provide an event database that viewers may access while watching television.

Many cable television systems are in the process of replacing, or have recently completed replacing, their conventional coaxial cable networks with higher bandwidth hybrid fiber optic coaxial (HFC) networks. These cable systems have greater channel capacities and are thus able to offer greater programming variety to their subscribers. Direct broadcast satellite (DBS) systems also have high channel capacities and are therefore able to offer a wide variety of television programming to their subscribers as well.

The increased channel capacity available in many cable systems and DBS systems have allowed these systems to increase the number of live events that are telecast to their subscribers. These live events, which may be of local, regional or national interest, may include, for example, sporting events, political events, judicial events, community events, entertainment events, as well as various other types of events.

Although the improvement in the number and the variety of televised live events is generally welcomed by subscribers, it may be difficult for subscribers to determine if any particular event is worth viewing at the expense of missing other television programming that may be of interest. Some viewers may wish to tune to a particular live event only at certain points in the event that are deemed to be significant. However, television viewers generally have no way of knowing when to tune to the live event because they do not know when the significant moments of a live event are going to occur. Many viewers try to solve this problem by tuning back and forth between channels, but this approach generally is considered to be cumbersome and distracting.

Many television viewers want to be informed of certain events which may be in progress while they are watching television programs, even if those events are not being telecast. For example, while viewing a particular football game on television, many viewers enjoy keeping track of the scores, statistics and highlights of other untelevised games being played at the same time. For many viewers, updates of the untelevised games provided by play-by-play announcers are not satisfactory because they do not occur frequently enough and do not provide sufficient detail.

Some telecasting systems offer sports packages that allow viewers to choose from several simultaneously telecast football games. Viewers in these systems generally want to spend most of their time watching the games in which their favorite teams are participating. However, many viewers would like the opportunity to tune to another game at significant moments without having to flip between channels to determine when such significant moments are occurring.

In view of the foregoing, it would be desirable to provide a system and method for presenting on a television, a combined display of information contained in an event database and television program video content.

It also would be desirable to provide a system and method for presenting on a television, information contained in an event database, wherein the displayed information pertains to televised events.

It would be further desirable to provide a system and method for presenting on a television, information contained in an event database, wherein the event database and the presented information are updated substantially in real-time.

It would be even further desirable to provide a system and method for presenting on a television, information contained in an event database, wherein the displayed information pertains to televised events and the system and method automatically tune, at the viewer's request, to an event for which information is being displayed.

SUMMARY OF THE INVENTION

It is an object of this invention to provide a system and method for presenting on a television, a combined display of information contained in an event database and television program video content.

It is another object of this invention to provide a system and method for presenting on a television, information contained in an event database, wherein the displayed information pertains to televised events.

It is a further object of this invention to provide a system and method for presenting on a television, information contained in an event database, wherein the event database and the presented information are updated substantially in real-time.

It is even a further object of this invention to provide a system and method for presenting on a television, information contained in an event database, wherein the displayed information pertains to televised events and the system and method tune automatically, at the viewer's request, to an event for which information is being displayed.

In accordance with this invention, there is provided a system and method that use digital data transmitted in a telecasting system to provide an event database that viewers may access while watching television. The event database preferably comprises information that is digitally transmitted from a telecasting facility, such as a cable television system headend or a satellite transmitting facility, to subscriber terminals. The subscriber terminals are preferably set-top terminals connected to conventional television sets or other suitable display devices. In addition to receiving the digital information used to provide the event database of the present invention, the set-top terminals also preferably receive conventional analog video content from the telecasting facility on a plurality of television channels which the viewers can tune to using tuning circuitry in the set-top terminals. In addition to conventional analog video content, the set-top terminals may also receive compressed digital video content which may be decompressed in the set-top terminals and displayed on the viewers' televisions. In a preferred embodiment, the present invention is implemented in a two-way telecasting system in which compressed digital video content may be transmitted in response to specific requests for such video content from viewers through the set-top terminals.

The telecasting facility may obtain data used to construct the event database from any suitable data provider which, of course, may vary depending on the desired content of the event database. Preferably, the data providers are able to provide an electronic data feed to the telecasting facility, for example, through a conventional modem link, a satellite or FM receiver, or a suitable network link. The information supplied by the data providers is preferably updated substantially in real-time in order to allow the event database of the present invention to be as current as possible.

The telecasting facility preferably includes computer systems that assemble data from one or more data providers to construct the event database, and transmit the event database to the set-top terminals along with the video content. In a two-way telecasting system, the telecasting facility may send the event database only to authorized set-top terminals that request the information. In this type of system, a set-top terminal may request the event database when a viewer initially requests information from the database, and at frequent intervals thereafter while the viewer is using the database in order to ensure that any updates to the database are promptly made available to the viewer. Alternatively, the event database may be continually transmitted by the telecasting facility. In both types of systems, the event database is preferably stored in memory in the set-top terminal, and is updated appropriately, while the viewer is using the event database.

The type of set-top terminal used in connection with the present invention preferably is responsive to viewer commands issued, for example, by way of an infrared remote control unit. The set-top terminal also is preferably capable of executing software in order to provide viewers with interactive applications which utilize digital data transmitted by the telecasting facility, such interactive applications including an event database navigator that a viewer can use to access the event database of the present invention.

The set-top terminal preferably includes graphics processing capabilities that allow the set-top terminal to combine video content with digital data that is formatted for display on the viewer's television. In particular, the set-top terminal used in connection with the present invention is capable of simultaneously presenting video content (e.g., a conventional television program) and information from the event database on the viewer's television when the viewer requests information from the event database. For example the event database information may be displayed as a banner in the lower portion of the television screen, while the video content continues to play in the upper portion of the screen. In this way, the viewer can peruse the event database without missing any portion of a television program of interest. The event database information displayed on the viewer's television set is updated as new information is received and processed by the set-top terminal.

The present invention also provides an event database navigator, which is an interactive application executed by the set-top terminal that allows the viewer to cause the set-top terminal to present various portions of the event database on the television screen in combination with the video content. In a preferred embodiment, the viewer's remote control unit includes up, down, left and right arrow keys. The left and right arrow keys may be used, for example, to obtain information for different events. The up and down arrow keys may be used, for example, to obtain detailed information for a particular event.

In a preferred embodiment of the invention, the event database contains information pertaining to televised events. This feature advantageously allows the viewer to monitor the progress of various televised events without having to tune away from a program of interest. In addition, the set-top terminal is preferably capable of automatically tuning to an event for which information is displayed in response to a request from the viewer to tune to that event.

The present invention utilizes the above-described graphics processing capabilities of the set-top terminal to present a combined display of video content transmitted from the telecasting facility and graphical images generated locally in the set-top terminal. The present invention provides systems and methods for improving the appearance of such combined images, in particular combined images that include moving graphical objects.

BRIEF DESCRIPTION OF THE DRAWINGS

The above and other objects and advantages of the present invention will be apparent upon consideration of the following detailed description, taken in conjunction with the accompanying drawings, in which like reference characters refer to like parts throughout, and in which.

DETAILED DESCRIPTION OF THE INVENTION

Figure 1:
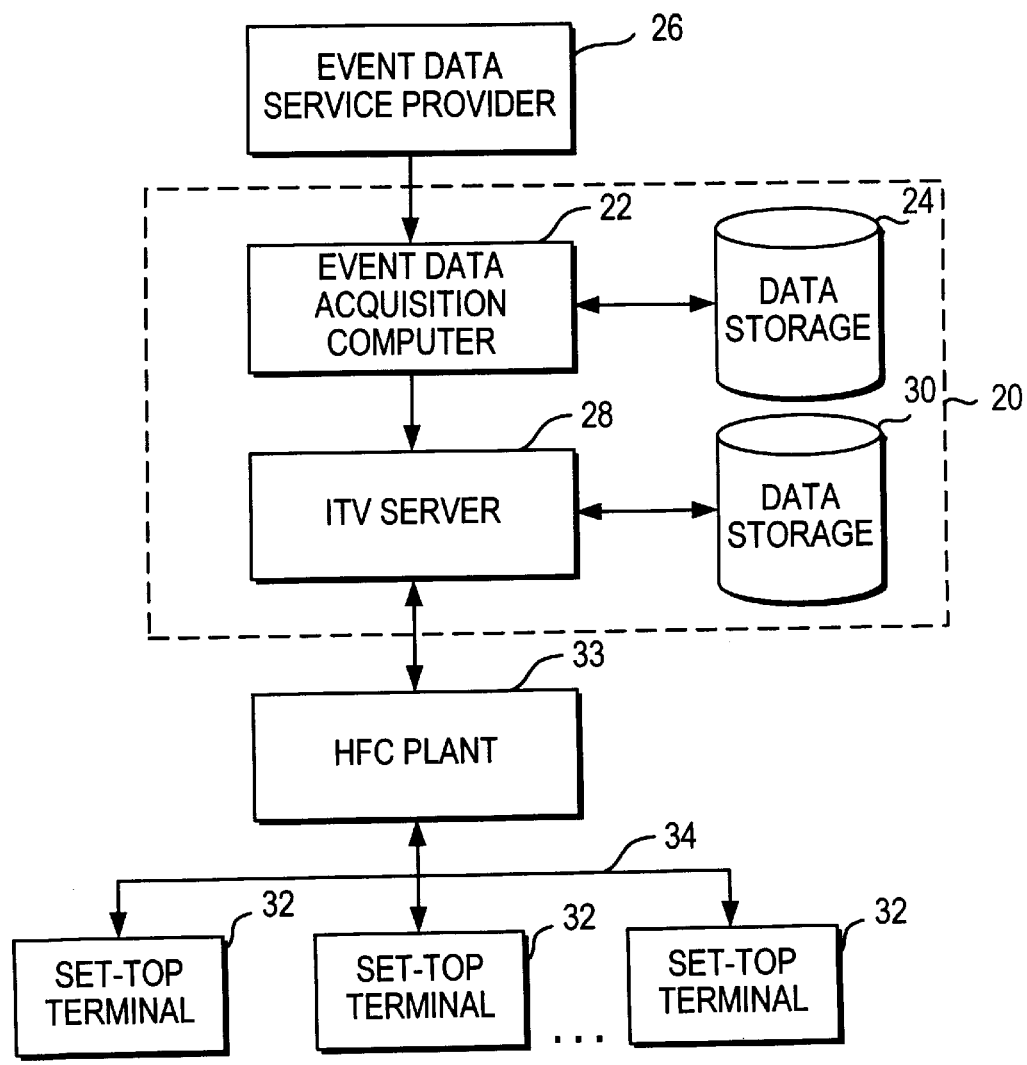
FIG. 1 is a block diagram representing a telecasting facility that maintains an event database in accordance with the principles of the present invention.

Referring first to FIG. 1, a telecasting facility 20 which assembles and maintains an event database in accordance with the principles of the present invention is described. The telecasting facility 20 is preferably a cable headend facility that provides two-way cable television service to cable subscribers. The telecasting facility 20 transmits digital data as well as television program video content to the cable television subscribers. It should be understood, however, that the present invention may be implemented in other types of television systems including one-way cable television systems and DBS systems.

The telecasting facility 20 has an event data acquisition computer 22 and an associated data storage unit 24. The event data acquisition computer 22 and the data storage unit 24 may be an Indy computer (available from Silicon Graphics, Inc., located in Mountain View, Calif.) which is preferably equipped with at least 1 GB of mass storage in the form of a hard disk drive. A similarly equipped personal computer would also be suitable for use as the event data acquisition computer 22.

The event data acquisition computer 22 receives event data from at least one, but preferably more than one, event data service provider 26. The event data acquisition computer 22 uses the received event data to create and maintain an event database in the data storage unit 24. The connection between the event service provider 26 and the event data acquisition computer 24 may be made through a modem link, a satellite or FM receiver, or a suitable network connection. The event data service provider 26 preferably provides real-time updates to event data as an event progresses. For example, in one embodiment of the invention, the event database stored in the data storage unit 24 includes information pertaining to sporting events. As a particular sporting event progresses, the event data service provider 26 provides updated information, such as revised scores and statistics, substantially in real-time. The event data acquisition computer 22 replaces outdated information with the new information in the event database stored in the data storage unit 24 as the new information is received. For sporting events, a suitable data provider may be SportsTicker, Inc., located in Jersey City, N.J.

The telecasting facility 20 also includes at least one, but preferably more than one, interactive television (ITV) server 28 and an associated data storage unit 30. The ITV server 28 may be a Challenge computer system (available from Silicon Graphics, Inc.) which is preferably equipped with a hard disk array that provides 100 GB of mass storage. The ITV server 28 is preferably connected to the event data acquisition computer 22 through a suitable network connection in order to receive a copy of the event database stored in the data storage unit 24. The ITV server 28 stores the event database in random access memory (not shown). Whenever the event data acquisition computer 22 receives an event database update from the event data service provider 26, the event data acquisition computer 22 provides the update to the ITV server 28. Each ITV server 28 preferably retains the event database just long enough to retransmit the information.

The ITV server 28 is connected to a plurality of set-top terminals 32 in a cable television system through an HFC plant 33 or other suitable means of transmission. A cable network 34 connects the HFC plant 33 to the set-top terminals 32 in the cable system. The cable network 34 is preferably a hybrid fiber optic coaxial (HFC) cable network, which provides substantially greater bandwidth than conventional coaxial cable networks. As shown in FIG. 1, the cable network 34 preferably enables two-way communication between the ITV server 28 and the set-top terminals 32 through the HFC plant 33, thereby allowing viewers to send requests to the telecasting facility 20.

The ITV server 28 is capable of sending various types of information to the set-top terminals 32. This information includes conventional analog video content, compressed digital video content, and information used in connection with providing interactive applications which run on the set-top terminals 32. The analog video content may be received by the telecasting facility 20 from any of a variety of known broadcasters of such video content. The digital video content is preferably compressed in accordance with the MPEG II video compression standard and stored in the data storage unit 30. In a two-way cable system, the digital video content may be used in connection with video-on-demand, whereby the digital video content is selectively transmitted to the set-top terminals 32 of authorized viewers who request the content. The telecasting facility 20 may also receive digital video content that is immediately rebroadcast to subscribers through the ITV server 28.

The information used to provide interactive applications may include software and data. New applications may be loaded into the ITV server 28, which in turn may transmit the applications (as modulated data) to the set-top terminals 32 over the cable network 34 through the HFC plant 33. In accordance with the present invention, the data transmitted for interactive applications include the event database. The modulated event database may be transmitted to the set-top terminals 32 periodically or, in a two-way system, on demand. Software which provides the event database navigator of the present invention also may be transmitted to the set-top terminals 32 periodically or on demand. Information used in connection with interactive applications is preferably transmitted to the set-top terminals 32 in an out-of-band channel; however, in band data communication such as VBI data insertion or MPEG private data, or side band transmission such as FM radio broadcast may be a suitable alternative.

In a telecasting system that includes a plurality of ITV servers 28, each ITV server 28 may be configured to service a subset of the set-top terminals 32 in the cable system. It should also be noted that the event data acquisition computer 22 and its associated data storage unit 24 do not need to be located in the same facility as the ITV server 28. For example, it may be preferable to use a single event data acquisition computer 22 that provides copies of the event database to many ITV servers 28 located in geographically dispersed telecasting facilities. This arrangement offers the advantage of centralized management of the event database.

Figure 2:
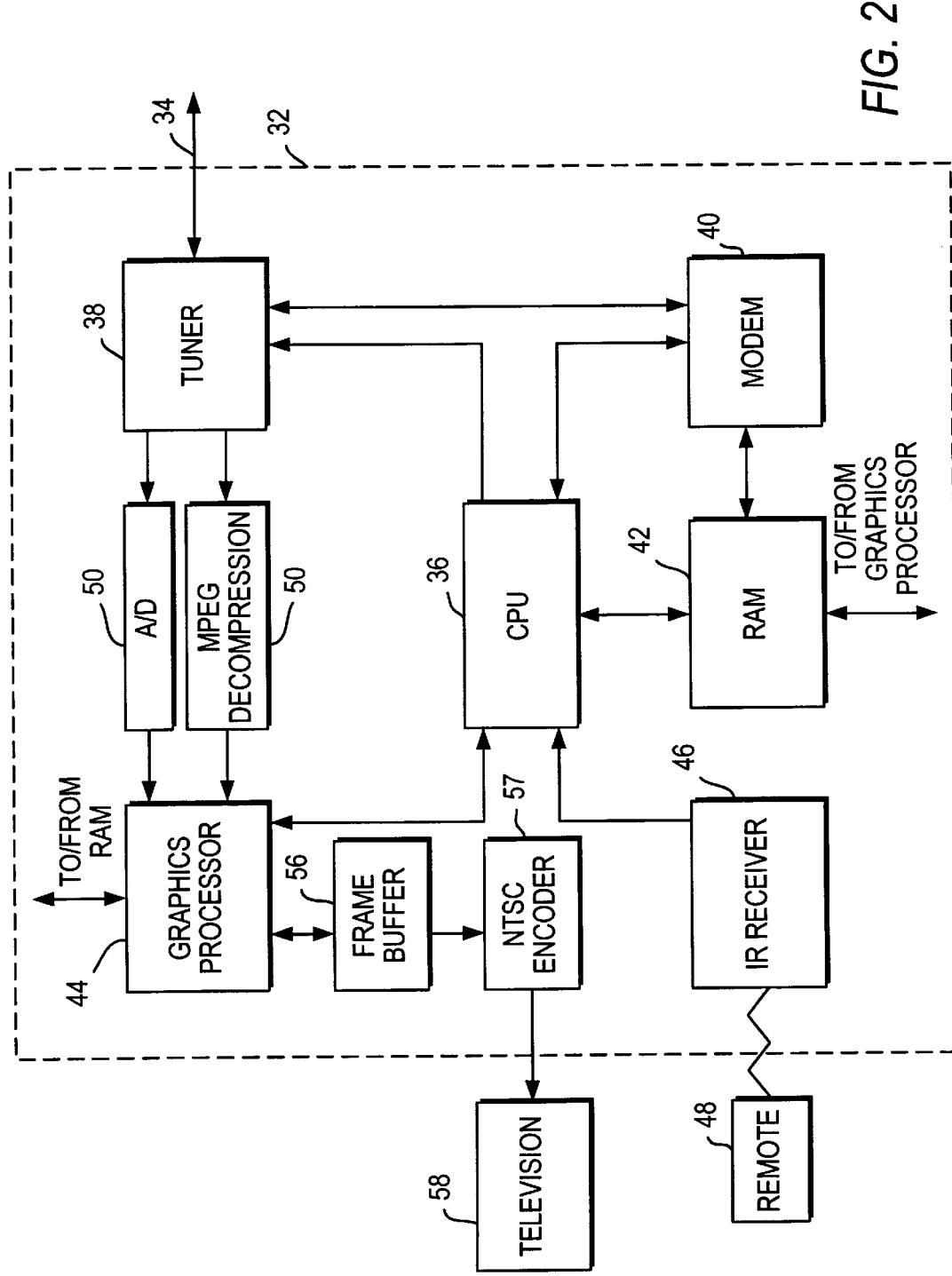
FIG. 2 is a block diagram of a set-top terminal that may be used to display information from an event database on a television set in accordance with the principles of the present invention.

Referring now to FIG. 2, a more detailed block diagram representing one of the set-top terminals 32 shown in FIG. 1 is described. The set-top terminal 32 is controlled by a central processing unit (CPU) 36. The CPU 36 is preferably a processor that is capable of executing multiple processes in parallel or as interleaved instruction streams. A suitable processor is the MIPS R4000 running the RiscKernel operating system, available from Silicon Graphics, Inc. The CPU 36 is coupled to a tuner 38, a modem 40, a random access memory (RAM) 42, a graphics processor 44, and an infrared (IR) receiver 46. The RAM 42 preferably provides at least 1 MB of storage; however, those skilled in the art will recognize that more or less storage may be used depending on the level of graphics resolution that is desired. The graphics processor 44 may be the Newport Graphics subsystem available from Silicon Graphics, Inc. The IR receiver 46 receives commands from an infrared remote control unit 48. It should be noted that a sufficiently powerful general-purpose processor may be used to perform the functions of both the CPU 36 and the graphics processor 44.

Coupled between the tuner 38 and the graphics processor 44 are an analog-to-digital (A/D) converter 50 and an MPEG decompression device 52. The graphics processor 44 is coupled to the RAM 42 and to a frame buffer 56. The frame buffer 56 is coupled to an NTSC encoder 57. The NTSC encoder 57 is coupled to an output port (not shown) of the set-top terminal 32. The output port is used to connect a television 58 or other suitable display device to the set-top terminal 32.

The remote control unit 48 may be used by a viewer to send commands to the CPU 36. Some of these commands may be conventional, such as commands to tune the set-top terminal 32 to analog video content channels. The remote control unit 48 is also used to request video-on-demand programs (in a two-way cable system) and to start and operate interactive applications such as the event database navigator of the present invention. Commands issued by the remote control unit 48 are received by the IR receiver 46, which in turn passes the commands on to the CPU 36 for processing.

Signals from the cable network 34 are received at an input port (not shown) of the set-top terminal 32 and are passed to the tuner 38. The tuner 38 passes the signals from the cable network 34 on to the modem 40. Under control of the CPU 36, the modem 40 demodulates the information used for interactive applications and passes the demodulated data on to the RAM 42 for storage. The interactive application data preferably are stored in the RAM 42 in a format that facilitates rapid retrieval by the CPU 36 and the graphics processor 44 when the viewer chooses to use an interactive application. The interactive application data include the event database of the present invention, and may also include the software for the event database navigator.

The CPU 36 also controls the tuner 38 responsive to commands from the remote control unit 48. When the CPU 48 receives a command to tune to an analog video content channel, the CPU 36 causes the tuner 38 to tune to the appropriate channel. The analog video content signal is converted to digital data by the A/D converter 50, which in turn passes the digital data on to the graphics processor 44. The graphics processor 44 stores the digital data on a frame by frame basis in the frame buffer 56. The digital data representing a frame of the analog video content stored in the frame buffer 56 are then presented to an NTSC encoder 57. The NTSC encoder 57 uses this data to construct an NTSC video signal which is supplied to the television 58 to cause the television 58 to display the video content being telecast on the selected analog channel. In an implementation in which in-band frequencies are used for video and out-of-band frequencies are used for data, the tuner 38 includes circuitry for tuning simultaneously to in-band and out-of-band frequencies.

In a two-way telecasting system, the viewer may use the remote control unit 48 to request video-on-demand programs. These requests are received by the CPU 36, which provides a suitably formatted request to the modem 40. The modem 40 modulates the request for transmission over the cable network 34 on a low bandwidth reverse data channel to the telecasting facility 20 (FIG. 1). The telecasting facility 20 (FIG. 1) responds by transmitting the compressed digital video content to the requesting set-top terminal 32 using an asynchronous transfer mode (ATM) communications protocol or any other suitable protocol such as MPEG II transport. In response to the same request, the CPU 36 causes the tuner 38 to tune to a prescribed digital video content channel. The compressed digital video content is provided to the MPEG decompression device 52 which decompresses the compressed digital video content and passes the decompressed data on to the graphics processor 44. The graphics processor 44 stores the decompressed data on a frame by frame basis in the frame buffer 56. The decompressed data stored in the frame buffer 56 are then presented to an NTSC encoder 57. The NTSC encoder 57 uses this data to construct an NTSC video signal which is supplied to the television 58 to cause the television 58 to display the digital video content that was selected by the viewer.

The viewer can use the remote control unit 48 to cause the set-top terminal 32 to display information from the event database of the present invention on the television 58. The event database may be selected by the viewer from a menu of interactive applications. Alternatively, the information from the event database may be automatically displayed under certain circumstances, such as when the viewer tunes to a designated television channel. In another alternative embodiment, the viewer can invoke the event database while watching any television channel by using, for example, a designated "short-cut" key on the remote control unit 48.

In a two-way system, the viewer's request for the event database may cause the set-top terminal 32 to request the data for the event database and the software for the event database navigator from the telecasting facility 20, in the same manner that requests are made for video-on-demand programs. In response, the telecasting facility 20 sends the appropriate data and software to the requesting set-top terminal 32, and the data and software are demodulated and stored in the RAM 42 as described above. In this embodiment, the CPU 36 preferably issues requests for the event database about once every 15 seconds while the event database is being used to ensure that recent updates to the event database are stored in the RAM 42.

In a one-way system, the software for the event database navigator may be stored in nonvolatile memory (not shown), such as flash memory, in the set-top terminal 32. The data for the interactive database may be periodically transmitted on the cable network 34 on a frequent basis, preferably every 10 seconds. The data are demodulated and stored in the RAM 42 as described above.

Information from the event database is preferably presented in a banner that is displayed in combination with television program video content. To accomplish this, the CPU 36 causes the graphics processor 44 to retrieve the appropriate event database information from the RAM 42. The graphics processor 44 then renders the retrieved data into a graphical format suitable for display on a television screen. The graphical representation of the retrieved data is stored in the frame buffer 56 to create a video frame comprising a combination of conventional television program video content and the locally generated graphical representation of the data contained in the event database. The contents of the frame buffer 56 are used to generate an NTSC video signal that is supplied to the television 58 to cause the television to display the graphical representation of the information from the event database along with the television program video content. Of course, the same process can be used to combine other types of locally generated graphical images with television program video content.

When the set-top terminal 32 receives updates to the event database, the CPU 36 instructs the graphics processor to retrieve the updated information from the RAM 42 in order to update the information being displayed on the television 58.

The set-top terminal 32 may be connected to an external printer (not shown) to allow the viewer to obtain printouts of information contained in the event database (as described in greater detail below).

In the following discussion, an event database which comprises information pertaining to sporting events, and in particular football games, is described in order to illustrate the principles of the present invention. It should be understood, however, that other types of information may be stored in the event database, in addition to, or as an alternative to sporting event-related data. For example, event databases may include information pertaining to political events, judicial events, community events, entertainment events, as well as various other types of events. Moreover, several different event databases may be used, each containing different types of information, without departing from the present invention.

Figure 3:
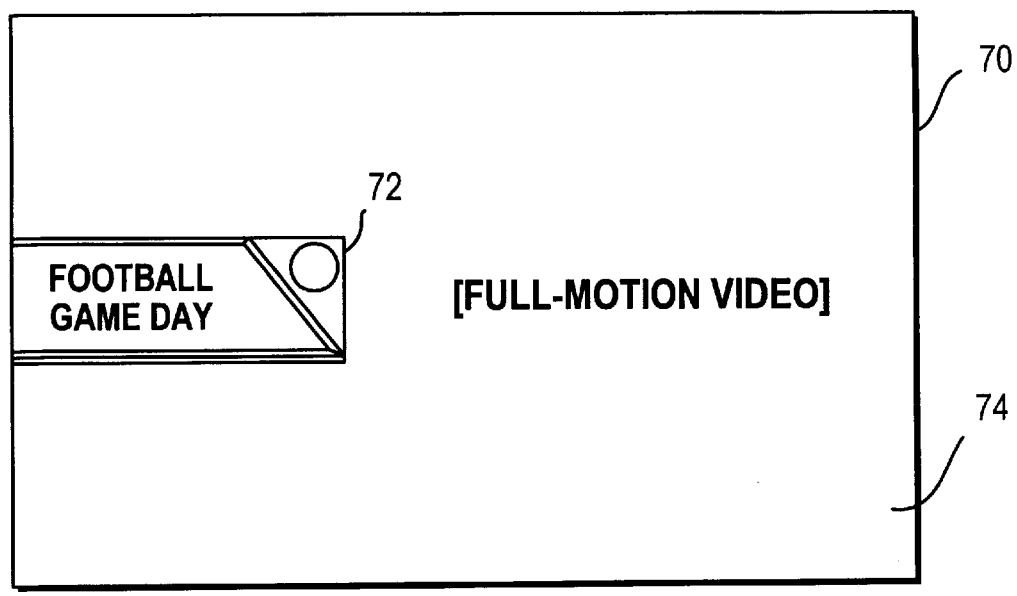
FIGS. 3–5 are illustrative screen displays which depict improved processes for combining television program video content and locally generated graphical images in accordance with the principles of the present invention.
Figure 4:
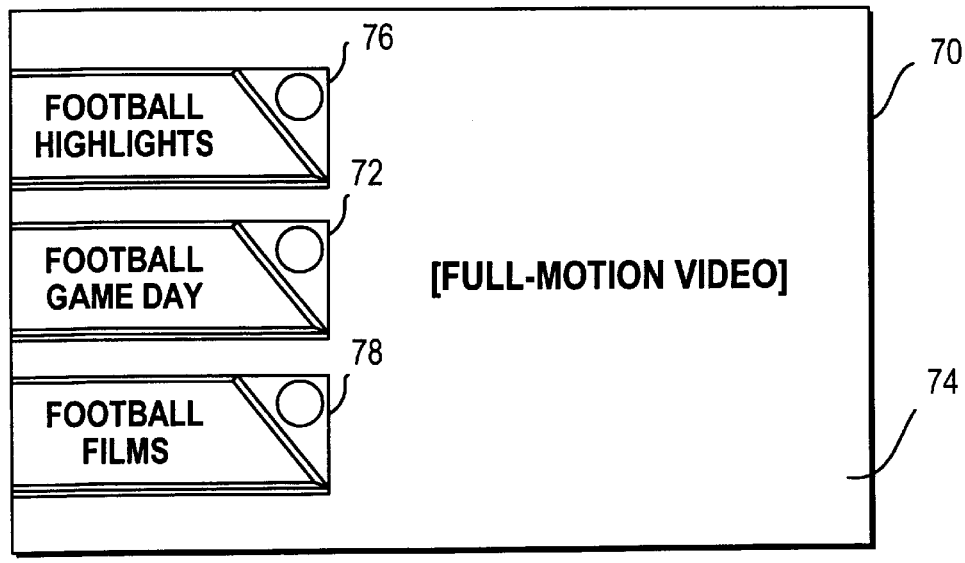
Figure 5:
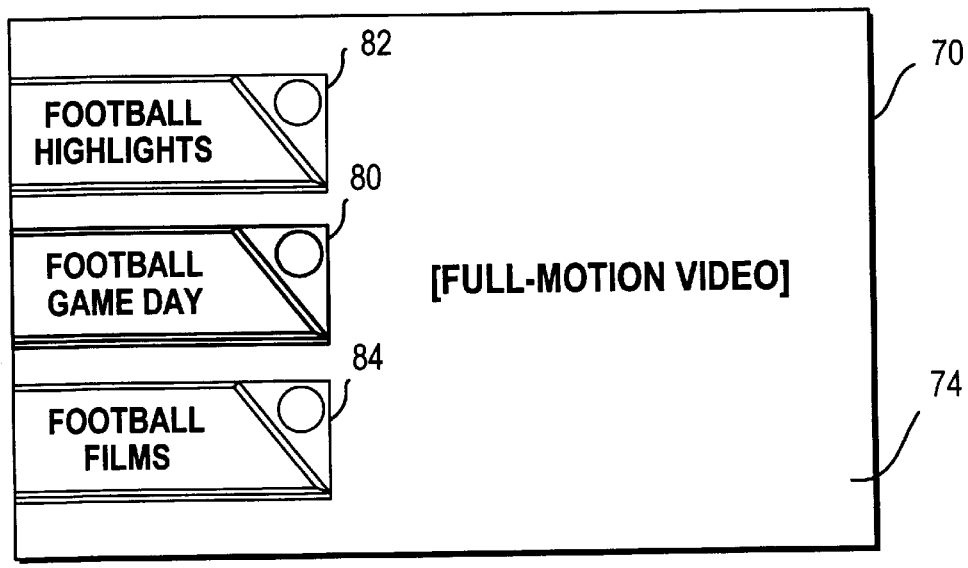

Referring now to FIGS. 3–5, a series of illustrative screen displays are described which depict improved processes for combining television program video content and locally generated graphical images in accordance with the principles of the present invention. The screen displays shown in FIGS. 3–5 may be used in connection with an interactive sports application that includes video-on-demand services as well as the event database of the present invention. It should be understood, however, that the processes described herein for combining locally generated graphical images with television video content may be used in other types of interactive applications.

When the viewer invokes the sports application (e.g., by choosing the application from a menu of applications or by tuning to a designated channel), the set-top terminal 32 (FIG. 2) begins the task of constructing a menu of available options. To accomplish this, the CPU 36 (FIG. 2) sends a request to the telecasting facility 20 (FIG. 1) for digital video content and software that are used to construct the menu. The set-top terminal 32 (FIG. 2) first processes the digital video content in order to cause the television 58 (FIG. 2) to display full-motion video of a menu being constructed. As shown in FIG. 3, a button image 72 initially appears on a screen 70. The button image 72 appears to emerge gradually from the left side of the screen 70 as an overlay on a full-motion video clip 74 displayed in the background. In fact, the button image 72 is not a locally generated overlay. Rather, the button image 72 is formed from the digital video content transmitted by the telecasting facility 20 (FIG. 1) (i.e., the button image 72 is part of the same digital video content transmission that is used to generate the full-motion video clip that appears to run in the background). Thus, the button image 72 is not an active button—i.e., the user cannot engage the button image 72 using the remote control unit 48 (FIG. 2). However, by initially forming the button image 72 using the digital video content, the button image 72 is introduced using studio-quality animation (i.e., the gradual movement from left to right) that may be difficult to accomplish locally in the set-top terminal 32 (FIG. 2).

As the digital video content continues to play on the screen 70, additional button images 76 and 78 emerge from the left side of the screen 70 in order to complete the menu display, as shown in FIG. 4. The CPU 36 (FIG. 2) notes the frame at which the button images 72, 76 and 78 settle into their final positions. Approximately 30 frames (1 second) later, the CPU 36 (FIG. 2) causes the graphics processor 44 to draw computer generated imagery (CGI) buttons over the button images 72, 76 and 78. During the next 30 frames, the graphics processor 44 (FIG. 2) draws both the button images 72, 76 and 78 and the corresponding CGI buttons at full intensity. During the following 30 frames, the graphics processor 44 (FIG. 2) continues to play the digital video content, in which the button images 72, 76 and 78 gradually fade, leaving only CGI buttons 80, 82 and 84, as shown in FIG. 5. However, for the following 40 frames, the CGI buttons 80, 82 and 84 remain locked to ensure that the viewer does not engage the buttons while the transition is proceeding.

Once the transition is complete, the viewer can engage the CGI buttons 80, 82 and 84 in order to make a choice from the menu. The viewer can use the up and down arrow keys on the remote control unit 48 (FIG. 2) to scroll the choices up and down. The user places the desired choice in the center position (in this case "Football Game Day") and then presses a designated key (such as "select") on the remote control unit 48 (FIG. 2) to actuate the desired choice. The center CGI button 80 is highlighted to indicate the choice that would be made when the user presses the designated key.

The present invention also provides a process for improving the appearance of moving, locally generated, graphical images, such as the CGI buttons 80, 82 and 84. Taking the example shown in FIG. 5, if the viewer wished to choose the "Football Highlights" choice in the menu, the viewer would press the down arrow key on the remote control 48 (FIG. 2) once to rotate the choices so that the CGI button 82 moves to the position occupied by the CGI button 80. An improved appearance is obtained by sliding the buttons into their new positions instead of abruptly changing their locations. However, in accordance with the present invention, the CGI buttons do not move at a constant speed toward their new locations. Instead, the CGI buttons initially appear to move rapidly, and then gradually slow down as they approach their target locations.

This process is accomplished as follows. Immediately after the viewer presses the down arrow key to move the CGI button 82 down to the center position, the CPU 36 (FIG. 2) computes the distance, in pixels, between the current position of the CGI button 82 and its target position. The CPU 36 (FIG. 2) multiplies the computed distance by a scaling factor between zero and one to obtain a distance, in pixels, that the CGI button 82 is to be moved in the next frame by the graphics processor 44 (FIG. 2). The CPU determines the distance, in pixels, between the new position of the CGI button 82 and the target position, and multiplies the new distance to the target by the same scaling factor to determine the distance to move the CGI button 82 in the next frame. Although it may seem as though the CGI button 82 may never reach the target location using this approach, pixel rounding due to the quantized nature of a raster display causes the CGI button 82 to eventually completely occupy the target location.

Figure 6:
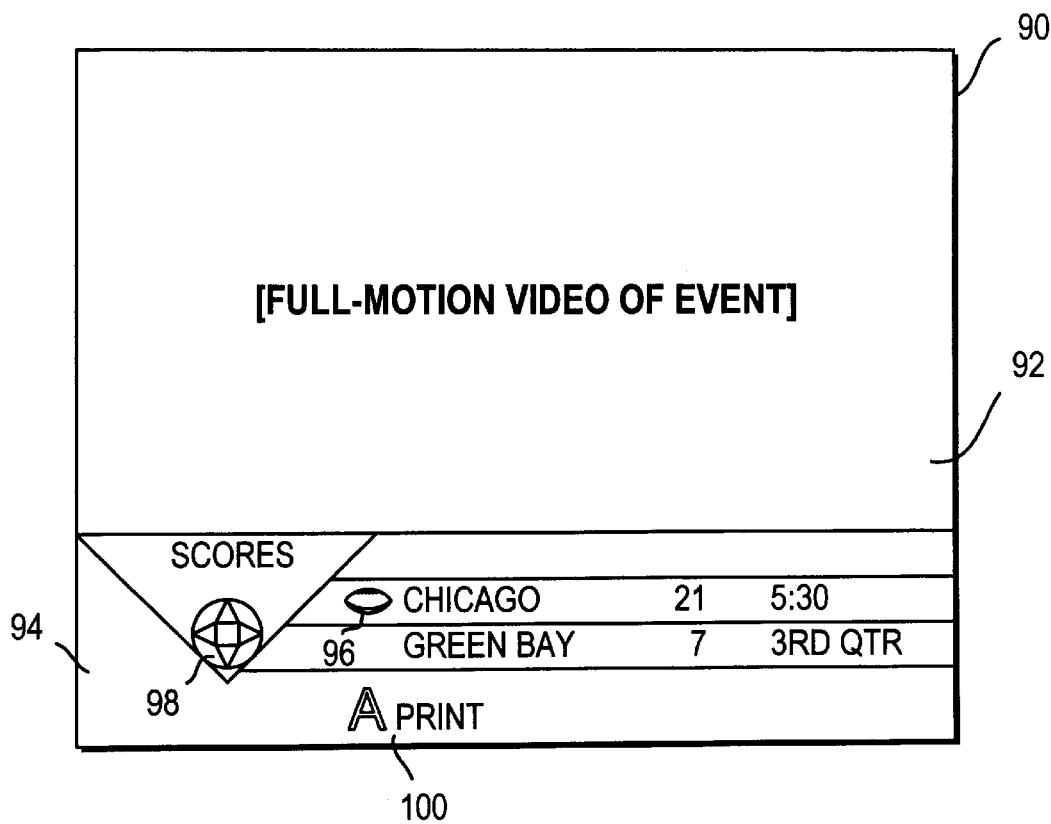
FIGS. 6–8 are illustrative screen displays which depict a combined display of television program video content and information from an event database in accordance with the principles of the present invention.
Figure 7:
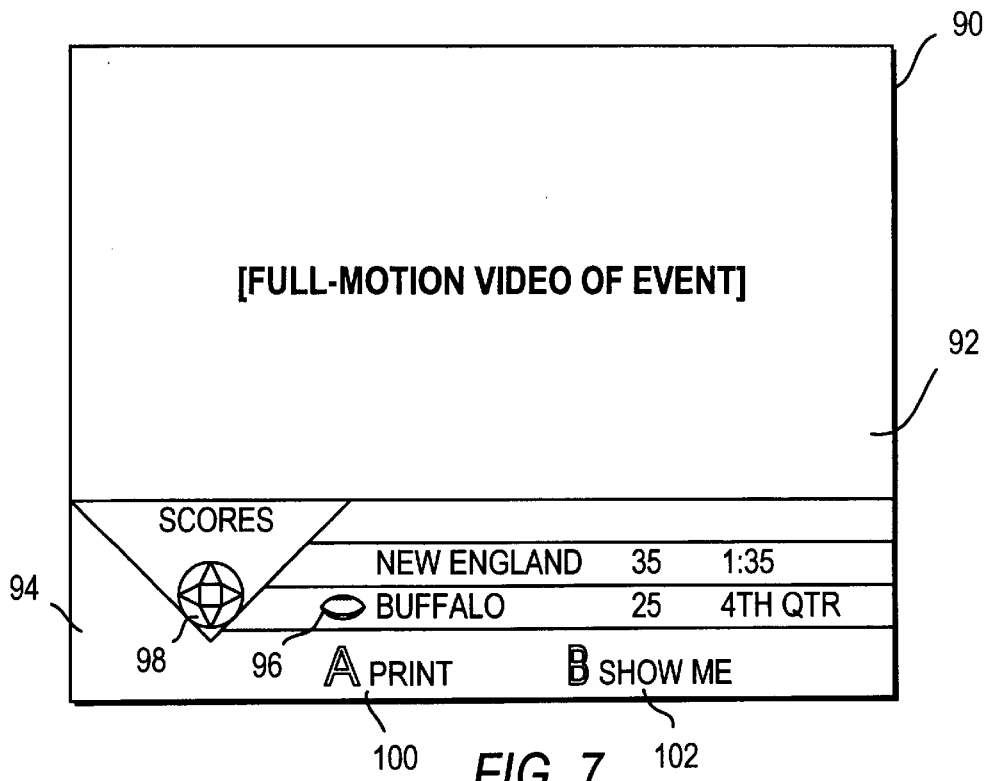
Figure 8:
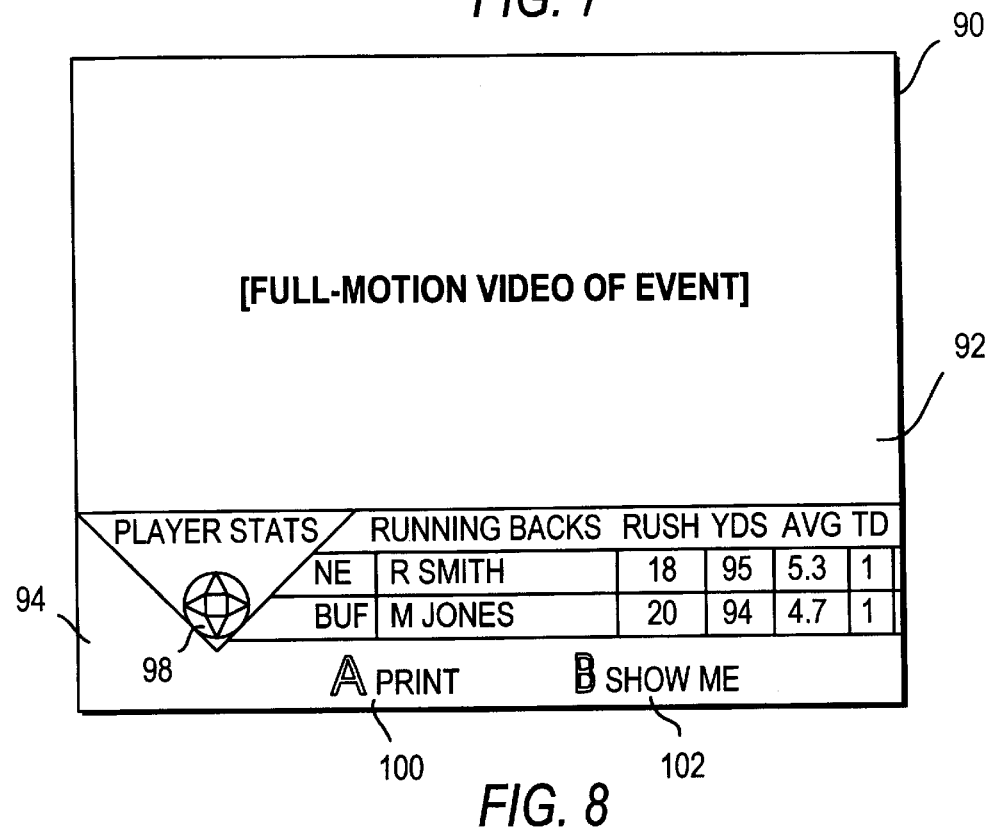

Turning now to FIGS. 6–8, the event database and event database navigator of the present invention are described. FIG. 6 depicts a screen 90 that may be displayed on the television 58 (FIG. 2) when after the user selects the "Football Game Day" choice from the menu shown in FIG. 5. The screen 90 includes a television program video content region 92 and an event database banner 94. A conventional television program preferably appears in the video content region 92. In this example, the video content is a live football game which is selected by the telecasting facility operator from, potentially, a plurality of available games. When the viewer selects the "Football Game Day" menu item, the set-top terminal 32 (FIG. 2) tunes to the television channel carrying the designated program.

In an alternative embodiment, the screen 90 may be displayed when the viewer tunes in a conventional manner to television programs for which there is information contained in the event database. To accomplish this, the CPU 36 (FIG. 2) uses information stored in the RAM 42 (FIG. 2) that defines the television programs for which there is information contained in the event database. When the viewer tunes to such a program, the CPU 36 (FIG. 2) automatically causes the event database banner 94 to be generated with information from the event database that pertains to the television program to which the viewer tuned.

In another alternative embodiment, the screen 90 may be displayed when the viewer presses a designated "short-cut" key on the remote control unit 48 (FIG. 2). In this embodiment, the information displayed in the event database banner 94 may not pertain to the television program displayed in the video content region 92. Instead, the information in the banner 94 may relate to other televised events, or even untelevised events.

The event database banner 94 is preferably displayed by the set-top terminal 32 (FIG. 2) as an overlay on a portion of the video content being shown on the screen 90. Thus, when the banner 94 is removed, additional video content appears in the area previously occupied by the banner 94.

Alternatively, the full video content may be "squeezed" by the graphics processor 44 (FIG. 2) to-fit within the video content region 92. The banner 94 preferably initially displays information which pertains to the event appearing in the video content region 92. In this example, the banner 94 initially includes the teams, score, quarter, and time left in the quarter for the football game displayed in the video content region 92.

The event database banner 94 also includes a possession icon 96 that identifies the team that has possession of the football in the game for which information is being displayed in the banner 94 (which may or may not be the game displayed in the video content region 92). The location of the possession icon 96 is updated in real-time as possession changes during the game. Alternatively, the location of the possession icon 96 may be updated only after prescribed significant moments in the game (e.g., only after scoring plays).

The event database banner 94 also includes a control icon 98 which informs the viewer that the up, down, left and right arrow keys on the remote control unit 48 may be used to navigate in the event database to cause additional information to appear in the banner 94. In a preferred embodiment, the left and right arrow keys are used to obtain information about other events, which may include televised and untelevised events. In the example shown in FIG. 6, the left and right arrow keys may be used to obtain information about other football games, including games which are in progress. Information for games which are complete or have yet to start may also be provided. The left and right arrow keys preferably operate in an endless loop fashion.

The up and down arrow keys are preferably used to obtain additional information about a particular event. For football games, this information may include for example, team statistics, individual statistics and textual descriptions of the event. This information is preferably updated in real-time as the event progresses. Thus, while viewing statistics in the banner 94, the viewer may see the statistics change as the game progresses. The up and down arrow keys also preferably operate in an endless loop fashion.

The event database banner 94 also includes a print icon 100 that informs the user that an "A" button on the remote control unit 48 (FIG. 2) may be pressed in order to cause the set-top terminal 32 (FIG. 2) to generate a print-out on a connected printer (not shown) of the information contained in the event database that pertains to the event for which the event database banner 94 is currently displaying information.

FIG. 7 depicts the screen 90 as it may appear after the viewer presses the left or right arrow key to obtain information about a different event. The video content region 92 continues to display the event (e.g., football game) that was displayed before the viewer pressed the left or right arrow key. However, the event database banner 94 contains information about a different event (e.g., a different football game). The information for the new event is also preferably updated in real-time as the new event progresses.

In addition to the information described above in connection with FIG. 6, the event banner 94 shown in FIG. 7 includes a show me icon 102. The show me icon 102 preferably is displayed when the information in the event database banner 94 pertains to an event that is presently being telecast on a channel other than the one to which the set-top terminal 32 (FIG. 2) is tuned (i.e., the information is related to a televised event other than the television program displayed in the video content region 92). The show me icon 102 informs the viewer that a "B" key on the remote control unit 48 may be pressed to cause the set-top terminal 32 (FIG. 2) to tune to the event indicated by the information contained in the banner 94. This is accomplished by including channel information for televised events in the event database stored in the RAM 42 (FIG. 2). When the user selects the show me icon 102, the CPU 36 (FIG. 2) uses the channel information to cause the tuner 38 (FIG. 2) to tune to the channel carrying the selected event.

FIG. 8 depicts the screen 90 as it may appear when the viewer presses the up or down arrow key to obtain additional information about an event. In FIG. 8, the banner 94 displays individual rushing statistics for the football game that the viewer navigated to using the left or right arrow key as described in connection with FIG. 7. Any type of information may be displayed in the banner 94. For example, the banner 94 may inform the viewer that a particular team has substituted a new quarterback into the game. The viewer can then select the show me icon 102 to cause the set-top terminal 32 (FIG. 2) to tune to the game for which the new quarterback information was displayed. In this way, the viewer can watch an event of primary interest in the video content region 92 while keeping track of the progress of other events using the information displayed in the event database banner 94. If the other events are being televised, the viewer can quickly tune to them using the show me icon 102 in response to information displayed in the banner 94.

Figure 9:
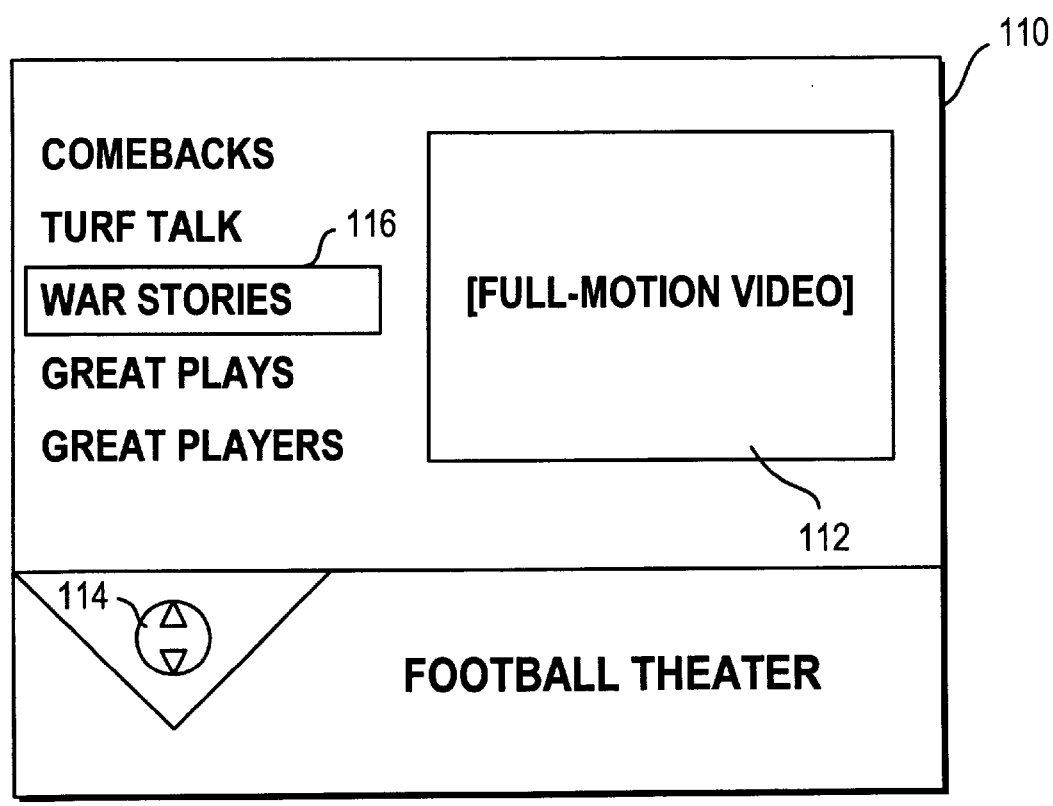
FIG. 9 is an illustrative screen display which may appear when the viewer selects the "Football Films" choice from the menu shown in FIG. 6.

FIG. 9 depicts an illustrative screen 110 that may be displayed when the viewer selects the "Football Films" choice from the sports application menu shown in FIG. 5. This feature provides on-demand video clips, and is thus suitable for two-way telecasting systems. The screen 110 includes a video clip region 112 that preferably displays a promotional video clip while the viewer makes a menu selection. A control icon 114 informs the user that the up and down arrow keys on the remote control unit 48 (FIG. 2) may be used to move a highlight bar 116 through video clip menu choices displayed in the screen 110. A designated key on the remote control unit 48 (FIG. 2), such as "select," may be pressed to request the video clip identified by the highlight bar 116. The set-top terminal 32 (FIG. 2) transmits a request for the desired video clip to the telecasting facility 20 (FIG. 1) over the cable network 34 (FIG. 2). In response, the telecasting facility 20 (FIG. 1) transmits compressed digital video content for the requested video clip. The compressed digital video content is processed by the set-top terminal 32 (FIG. 2) as discussed above in connection with FIG. 2. The video clip is preferably displayed in full-screen format on the screen 110.

A full-motion video clip of the previous week's football highlight may be obtained by selecting the "Football Highlights" choice from the menu shown in FIG. 5.

Figure 10:
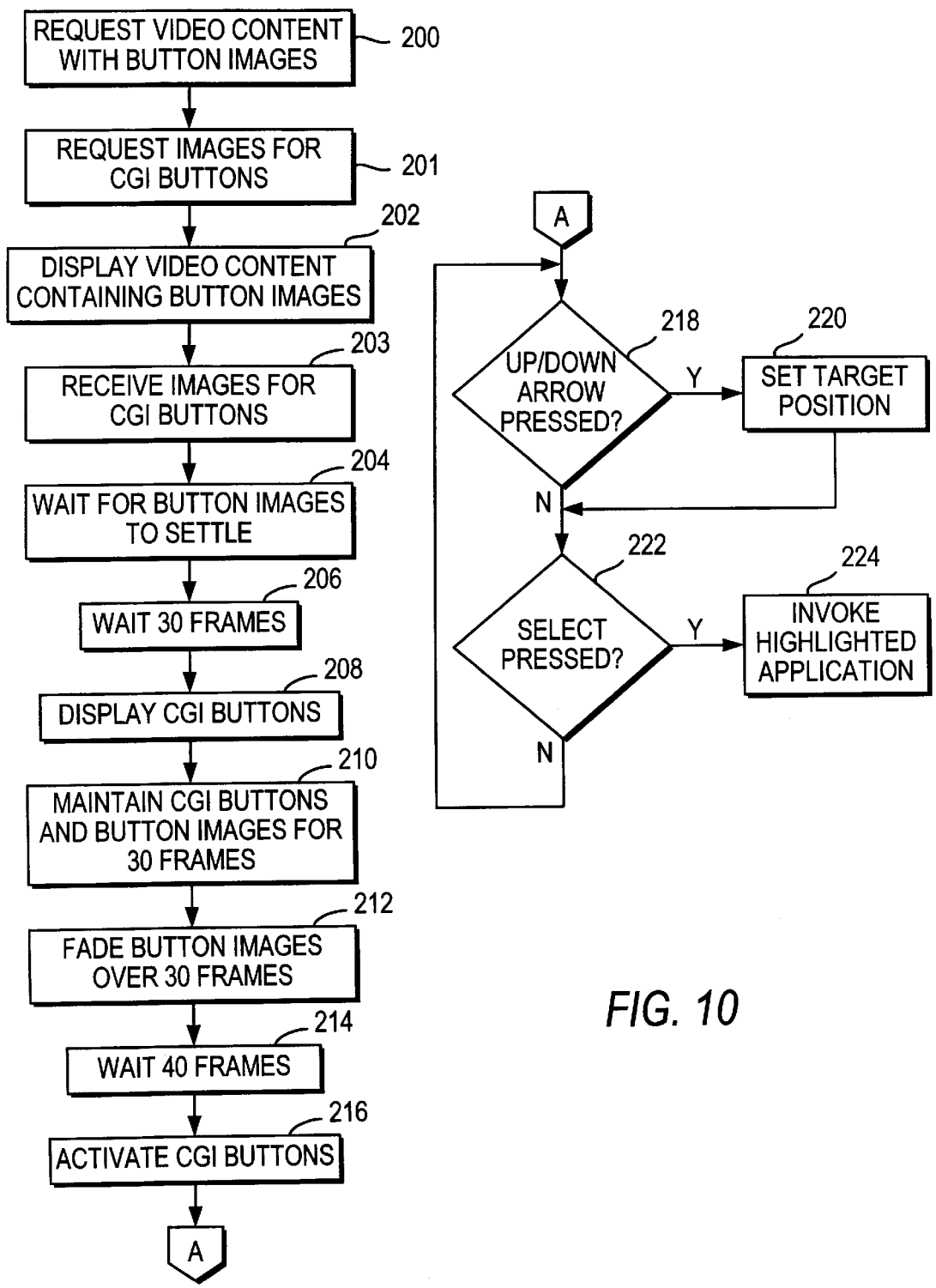
FIGS. 10 and 11 are process flow diagrams for generating a combined display of television video content and locally generated graphical images in accordance with the principles of the present invention.

Referring now to FIG. 10 a process flow diagram is described which represents processing steps performed by the CPU 36 (FIG. 2) for combining television program video content and locally generated graphical images in accordance with the principles of the present invention. This process is explained by reference to the menu described above in connection with FIGS. 3–5. It should be understood that although process flow diagrams described herein depict a linear sequence of processing steps, the CPU 36 (FIG. 2) may execute some of the described processes in parallel or as interleaved instruction streams which are supported by many operating systems such as Silicon Graphics' RiscKernel operating system.

In response to a viewer's request for the menu shown in FIGS. 3–5, the CPU 36 (FIG. 2) at step 200 transmits a request for compressed digital video content for the menu from the telecasting facility 20 (FIG. 1) over the cable network 34 (FIG. 2). At step 201, the CPU 36 (FIG. 2) transmits a request to the telecasting facility 20 (FIG. 1) for images of the CGI buttons. At step 202, the CPU 36 (FIG. 2) instructs the tuner 38 (FIG. 2) and the graphics processor 44 (FIG. 2) to receive and process the digital video content in order to cause the set-top terminal 32 (FIG. 2) to provide full-motion video content to the television 58 (FIG. 2), the full-motion video content including the video button images 72, 76 and 78 (FIG. 4). At step 203, the CPU 36 (FIG. 2) causes the modem 40 (FIG. 2) to receive the images for the CGI buttons and store the images in the RAM 42 (FIG. 2). Alternatively, the CGI buttons may be generated locally in the set-top terminal 32 (FIG. 2).

As indicated by step 204, the CPU 36 (FIG. 2) waits until a prescribed frame is reached, representing the point at which the video button images have settled. The CPU 36 (FIG. 2) then waits an additional 30 frames to ensure that the video button images have settled, as represented by step 206. At step 208, the CPU 36 (FIG. 2) causes the graphics processor 44 (FIG. 2) to retrieve the images for the CGI buttons from the RAM 42 (FIG. 2) and to display the CGI buttons at locations corresponding to the positions occupied by the video button images. At this point the video button images and CGI buttons are all displayed at full intensity.

For 30 frames, the video button images and the CGI buttons are maintained at full intensity, as indicated by step 210. During the next 30 frames, the video button images contained in the video are gradually faded out, as represented by step 212. The CPU 36 (FIG. 2) then waits 40 frames, as represented by step 214, before activating the CGI buttons to ensure that the viewer does not engage the buttons before the transition is complete. At step 216, the CGI buttons are activated.

Once the CGI buttons are activated, the CPU 36 (FIG. 2) waits for user input. If the CPU determines that the viewer has pressed the up or down arrow keys to scroll the CGI buttons, as represented by test 218, the CPU 36 sets a new target position for the CGI buttons at step 220. The new target position is used by a process described in connection with FIG. 11 to move the CGI buttons gradually to the target position.

If the CPU 36 (FIG. 2) determines that the viewer has pressed a designated "select" key on the remote control unit 48 (FIG. 2), as represented by test 222, the CPU 36 (FIG. 2) invokes the feature indicated by the highlighted CGI button at step 224. In the example shown in FIG. 5, pressing the select key would cause the CPU 36 (FIG. 2) to invoke the "Football Game Day" feature.

The loop from test 222 to test 218 represents the CPU 36 (FIG. 2) waiting for viewer input. It should be noted that the user can leave the menu shown in FIG. 5 at any time by pressing a designated key on the remote control unit 48 (FIG. 2) (e.g., an "exit" key).

Figure 11:
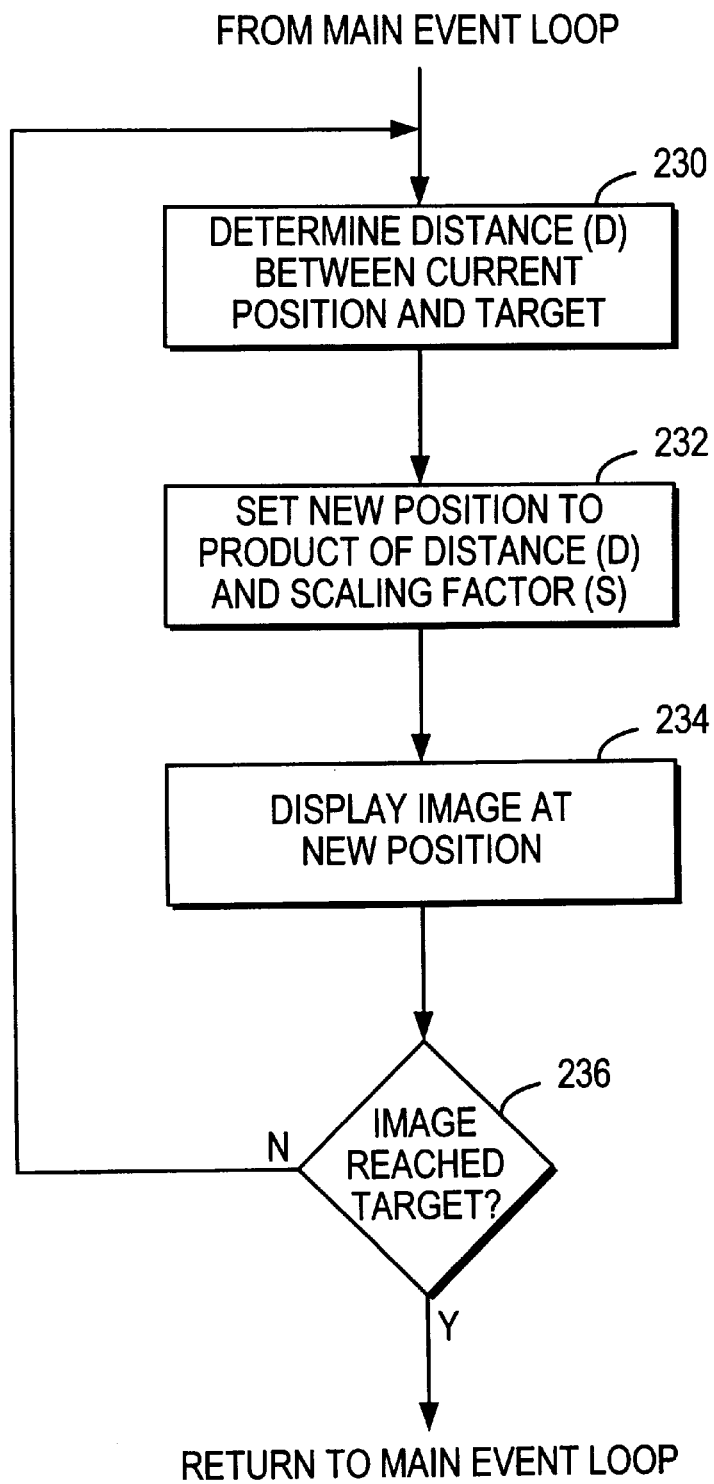

The process flow diagram shown in FIG. 11 represents a process executed by the CPU 36 (FIG. 2) to cause the CGI buttons to move gradually to the target position determined at step 220 (FIG. 10). This process is preferably executed once during each vertical retrace in parallel with other processes being performed by the CPU 36 (FIG. 2).

After starting from the main event loop, at step 230, the CPU 36 (FIG. 2) determines the distance (D) in pixels between the current position of the CGI buttons and the target position determined at step 220 (FIG. 10). At step 232, the CPU 36 (FIG. 2) sets the position of the CGI buttons for the next vertical retrace to be the product of the distance (D), and a scaling factor (S) between zero and one (e.g., 0.75). At step 234, the CPU 36 (FIG. 2) causes the graphics processor 44 (FIG. 2) to display the CGI buttons at the new position in the next vertical retrace. At test 236, the CPU 36 (FIG. 2) determines if the CGI buttons have reached the target position. If not, the process loops back to step 230. Otherwise, control returns to the main event loop. Thus, the process shown in FIG. 11 repeats until the CGI buttons reach their final destination (which is eventually reached due to pixel rounding). To move the CGI buttons quickly, a relatively high scaling factor (S) is used. To move the CGI buttons slowly, a low scaling factor (S) is selected.

Figure 12:
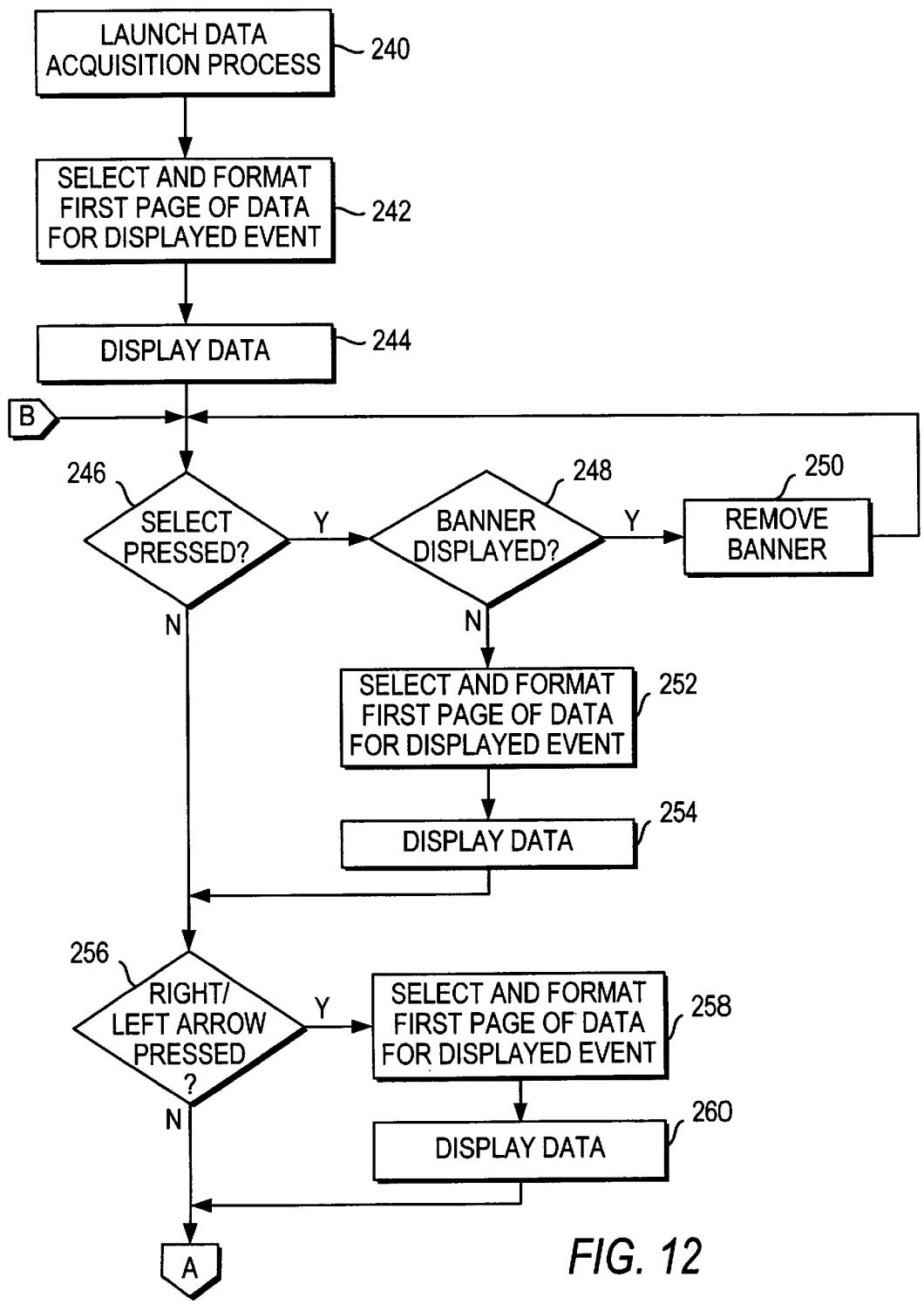
FIGS. 12 and 13 are process flow diagrams for generating a combined display of television video content and information from an event database in accordance with the principles of the present invention.
Figure 13:
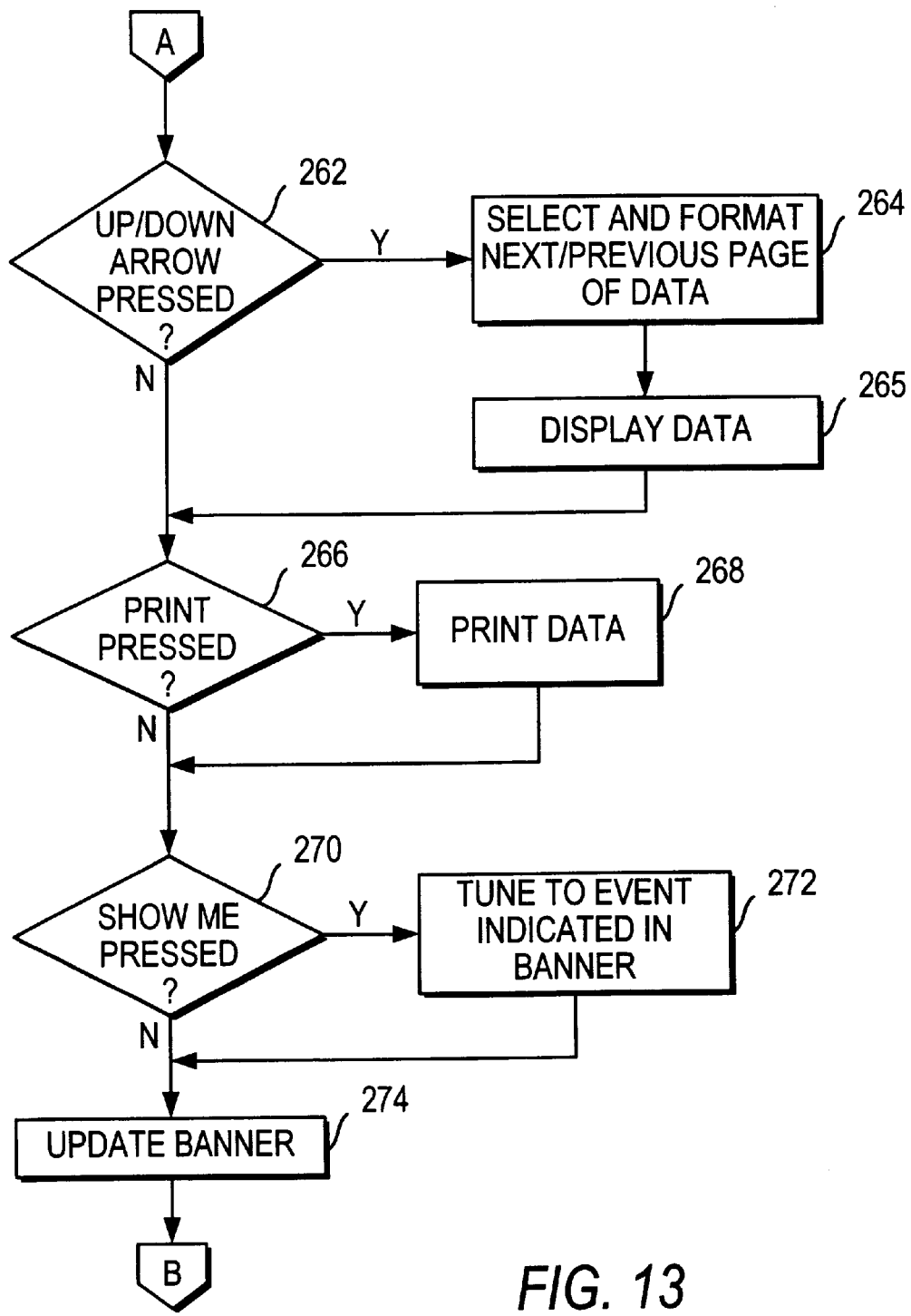

Referring now to FIGS. 12 and 13, a process flow diagram is described which represents processes performed by the CPU 36 (FIG. 2) to provide the event database and the event database navigator of the present invention. The CPU 36 (FIG. 2) performs the processes shown in FIGS. 12 and 13 when the user requests to display information from the event database. As explained above, such requests may be made in a variety of ways, for example, through a menu choice (such as the "Football Game Day" menu choice shown in FIG. 5), by tuning to a designated channel, or by pressing a designated "short-cut" key on the remote control unit 48 (FIG. 2).

At step 240, the CPU 36 (FIG. 2) launches a data acquisition process which preferably runs in parallel with other process to allow the set-top terminal 32 (FIG. 32) to initially receive the event database, and to thereafter receive updates to the event database substantially in real-time. As explained above, in a two-way telecasting system, the data acquisition process may cause the set-top terminal 32 (FIG. 2) to transmit frequent requests (e.g., once every 15 seconds) to the telecasting facility 20 (FIG. 1) for updated information. In a one-way telecasting system, the data acquisition process is responsible for collecting the event database information that is periodically transmitted over the cable network 34 (FIG. 2). In either case, the event database information is preferably stored in the RAM 42 (FIG. 2).

At step 242, the CPU 36 (FIG. 2) selects and formats event database information to be initially displayed in the event database banner. Preferably, the initially displayed information comprises a first page of information pertaining to a televised event that is currently being displayed on the television 58 (FIG. 2). However, if no data exists for the currently displayed program, a default initial display defined by a telecasting system operator may be used. At step 244, the CPU 36 (FIG. 2) causes the graphics processor 44 (FIG. 2) to generate the event database banner comprising the selected and formatted data.

The CPU 36 (FIG. 2) waits for input from the viewer. If the CPU 36 (FIG. 2) determines that the viewer pressed a designated "select" key, as represented by test 246, a test 248 is performed to determine if the event database banner is currently displayed on the television 58 (FIG. 2). If the banner is currently displayed, the CPU 36 (FIG. 2) causes the graphics processor 44 (FIG. 2) to remove the banner at step 250. Otherwise, the CPU 36 (FIG. 2) selects and formats data from the event database at step 252 and causes the graphics processor 44 (FIG. 2) to generate the event database banner comprising the selected and formatted data at step 254. Thus, the "select" key operates as a toggle to turn the event database banner on and off. The event database banner preferably includes the first page of information for the event currently being displayed on the television 58 (FIG. 2) (if available) each time the viewer requests a new display of the event database banner.

If the CPU 36 (FIG. 2) determines that the viewer pressed the right or left arrow key, as represented by test 256, the CPU 36 (FIG. 2) at step 258 selects and formats the first page of data to be displayed for the next or previous event in the event database. At step 260, the CPU 36 (FIG. 2) causes the graphics processor to generate the event database banner comprising the selected and formatted data.

If the CPU 36 (FIG. 2) determines that the viewer pressed the up or down arrow key, as represented by test 262, the CPU 36 (FIG. 2) at step 264 selects and formats the next or previous page of data for the event for which the event database banner is currently displaying information. At step 265, the CPU 36 (FIG. 2) causes the graphics processor to generate the event database banner comprising the selected and formatted data.

If the CPU 36 (FIG. 2) determines that the viewer pressed the print key, as represented by test 266, the CPU 36 (FIG. 2) at step 268 causes the set-top terminal 32 (FIG. 2) to generate a print-out on a connected printer (not shown) of the information contained in the event database that pertains to the event for which the event database banner is currently displaying information.

If the CPU 36 (FIG. 2) determines that the viewer pressed the show me key, as represented by test 270, the CPU 36 (FIG. 2) at step 272 causes the set-top terminal 32 (FIG. 2) to tune to the event for which the event database banner is currently displaying information. The CPU 36 (FIG. 2) accomplishes this using channel information that is preferably provided with the event database. The show me key preferably is inactive if the event is not currently being televised.

Step 274 represents that the CPU 36 (FIG. 2) causes the graphics computer 44 (FIG. 2) to update the displayed event database banner as updated information is received by the set-top terminal 32 (FIG. 2) from the telecasting facility 20 (FIG. 1). As shown in FIGS. 12 and 13, the process loops back to test 246 to allow the CPU 36 (FIG. 2) to wait for further input from the viewer.

Although the present invention has been described using a digital set-top terminal as an illustrative hardware platform, it should be understood that other hardware platforms may be used instead. For example, the present invention may be implemented using suitably equipped analog set-top terminals, such as the 8600x set-top box available from Scientific-Atlanta, Inc. located in Norcross, Ga., or the CFT-2200 set-top box available from General Instrument Corp. located in Hatboro, Pa. In another alternative embodiment, the combined video content and event database displays are generated using information provided directly from the event database data provider in transmissions that are separate from the video content signals. For example, viewers may be provided with equipment that includes, in addition to suitable tuning and processing circuitry, an FM receiver for receiving event database information transmitted by the data provider using an FM subcarrier.

Thus a system and method are provided for presenting on a television, a combined display of information contained in an event database and television program video content. One skilled in the art will appreciate that the present invention can be practiced by other than the described embodiments, which are presented for purposes of illustration and not of limitation, and the present invention is limited only by the claims which follow.

What is claimed is:

1. A system for providing a viewer with a combined display of television video content and information from an event database, said system comprising:

a video content receiver for receiving television video content for a plurality of television programs including a first televised event;

a data receiver for receiving said event database, said event database including information pertaining to a plurality of events including said first televised event;

a viewer input receiver for receiving viewer inputs including a request for said first televised event; and a processor for causing said video content receiver to provide said television video content for said first televised event based on said request for said first televised event, for selecting information pertaining to said first televised event from said event database, and for generating a combined display of said television video content for said first televised event and said selected information pertaining to said first televised event; wherein:

said data receiver receives undated event database information in substantially real-time in response to an occurrence within one of said events, said updated event database information pertaining to said occurrence.

2. The system of claim 1, wherein said viewer inputs further include event database navigation inputs and, responsive to said event database navigation inputs, said processor selects information from said event database pertaining to events other than said first televised event and generates combined displays of said television video content for said first televised event and said information pertaining to said other events for display on said display unit.

3. The system of claim 1, wherein said viewer inputs further include event database navigation inputs and, responsive to said event database navigation inputs, said processor selects additional information from said event database pertaining to said first televised event and generates a combined display of said television video content for said first televised event and said additional information for display on said display unit.

4. The system of claim 1 further comprising memory, wherein said event database information received by said data receiver is stored in said memory and said processor selects said information pertaining to said first televised event by retrieving said information pertaining to said televised event from said memory.

5. The system of claim 1, wherein said combined display comprises a banner overlaying a portion of said television video content for said first televised event, said banner displaying said selected information pertaining to said first televised event.

6. The system of claim 1, wherein said combined display comprises a banner which displays said selected information pertaining to said first televised event, and said processor resizes said television video content for said first televised event to fit within a portion of said combined display unoccupied by said banner.

7. The system of claim 1, wherein said event database comprises statistical information pertaining to said first televised event, and said processor displays said statistical information in said combined display.

8. The system of claim 7, wherein said data receiver receives updates to said statistical information, and said processor updates said combined display using said updated statistical information.

9. The system of claim 1, wherein:

said video content receiver receives television program video content for at least one additional televised event;

said data receiver receives information pertaining to said at least one additional televised event as part of said event database, said information pertaining to said at least one televised event including channel tuning information;

said viewer inputs include event database navigation inputs and an event selection input; and said processor, in response to said event database navigation inputs, selects information from said event database pertaining to said at least one additional televised event and generates a combined display of said television video content for said first televised event and said information pertaining to said at least one additional televised event, wherein, in response to said event selection input, said processor causes said video content receiver to provide said television video content for said at least one additional televised event for display on said display unit.

10. The system of claim 9 wherein said processor, in response to said event selection input, generates a combined display of said television program video content for said at least one additional televised event and said information pertaining to said at least one additional televised event for display on said display unit.

11. The system of claim 2 wherein said processor causes a print-out of said selected information to be generated in response to said event database navigation inputs.

12. The system of claim 1 wherein said processor updates said combined display in substantially real-time in response to said data receiver receiving said updated event database information.

13. The system of claim 1 wherein said one event is a live activity selected from the group consisting of a sporting event, a political event, a judicial event, a community event, and an entertainment event.

14. A method of generating a user interface object on a display unit, comprising:

receiving video content from a video content provider, said video content including an image of said user interface object;

displaying said video content including said image of said user interface object on said display unit, said image of said user interface object being unavailable for user interaction;

overlaying said user interface object on said video content so that said user interface object substantially registers with said image of said user interface object; and activating said user interface object to allow user interaction with said user interface object.

15. A method of moving a user interface object from a first position to a target position on a display unit, said method comprising:

(a) defining said target position for said user interface object;

(b) determining a distance between a current position of said user interface object and said target position;

(c) multiplying said distance by a scaling factor to define a next position for said user interface object;

(d) displaying said user interface object at said next position; and (e) repeating (a)–(d) until said user interface object reaches said target position.

16. The method of claim 14 wherein said scaling factor ranges between zero and one.

17. The method of claim 14 wherein said distance is measured in pixels.

18. The method of claim 17, wherein said multiplying comprises rounding said distance to a nearest pixel.

19. The method of claim 15 wherein said repeating of (a)–(d) causes said user interface object to move from said first position to said target position at varying speeds.

20. A system for providing a viewer with a combined display of television video content and information from an event database, said system comprising:

a video content receiver for receiving television video content for a plurality of television programs including a first televised event;

a data receiver for receiving said event database, said event database including information pertaining to a plurality of events including said first televised event;

a viewer input receiver for receiving viewer inputs including a request for said first televised event; and a processor for causing said video content receiver to provide said television video content for said first televised event based on said request for said first televised event, for selecting information pertaining to said first televised event from said event database, and for generating a combined display of said television video content for said first televised event and said selected information pertaining to said first televised event; wherein:

said data receiver receives updated event database information in response to an occurrence within one of said events, said updated event database information pertaining to said occurrence; and said processor updates said combined display in substantially real-time in response to said data receiver receiving said updated event database information.

21. The system of claim 20 wherein said viewer inputs further include event database navigation inputs and, responsive to said event database navigation inputs, said processor selects information from said event database pertaining to an event other than said first televised event and generates a combined display of said television video content for said first televised event and said information pertaining to said other event for display on said display unit.

22. The system of claim 21 wherein said event other than said first televised event is an untelevised event.

23. The system of claim 20 wherein said viewer inputs further include event database navigation inputs and, responsive to said event database navigation inputs, said processor selects additional information from said event database pertaining to said first televised event and generates a combined display of said television video content for said first televised event and said additional information for display on said display unit.

24. The system of claim 20 wherein said data receiver receives said updated event database information substantially in real-time as said events progress.

25. The system of claim 20 further comprising memory, wherein said event database information received by said data receiver is stored in said memory and said processor selects said information pertaining to said first televised event by retrieving said information pertaining to said televised event from said memory.

26. The system of claim 20 wherein said combined display comprises a banner overlaying a portion of said television video content for said first televised event, said banner displaying said selected information pertaining to said first televised event.

27. The system of claim 20 wherein said combined display comprises a banner which displays said selected information pertaining to said first televised event, and said processor resizes said television video content for said first televised event to fit within a portion of said combined display unoccupied by said banner.

28. The system of claim 20 wherein said event database comprises statistical information pertaining to said first televised event, and said processor displays said statistical information in said combined display.

29. The system of claim 28 wherein said data receiver receives updates to said statistical information, and said processor updates said combined display using said updated statistical information.

30. The system of claim 20 wherein:
said video content receiver receives television program video content for at least one additional televised event;
said data receiver receives information pertaining to said at least one additional televised event as part of said event database, said information pertaining to said at least one televised event including channel tuning information;
said viewer inputs include event database navigation inputs and an event selection input; and
said processor, in response to said event database navigation inputs, selects information from said event database pertaining to said at least one additional televised event and generates a combined display of said television video content for said first televised event and said information pertaining to said at least one additional televised event,
wherein, in response to said event selection input, said processor causes said video content receiver to provide said television video content for said at least one additional televised event for display on said display unit.

31. The system of claim 30 wherein said processor, in response to said event selection input, generates a combined display of said television program video content for said at least one additional televised event and said information pertaining to said at least one additional televised event for display on said display unit.

32. The system of claim 20 wherein said one event is a live activity selected from the group consisting of a sporting event, a political event, a judicial event, a community event, and an entertainment event.

33. A system for providing a viewer with a combined display on a display unit of television video content and information from an event database, said system comprising:
a video content receiver for receiving television video content for a plurality of television programs including a first televised event;
a data receiver for receiving said event database, said event database including information pertaining to a plurality of events including said first televised event;
a viewer input receiver for receiving viewer inputs including a request for said first televised event; and
a processor for causing said video content receiver to provide said television video content for said first televised event based on said request for said first televised event, for selecting information pertaining to said first televised event from said event database, for generating a combined display of said television video content for said first televised event and said selected information pertaining to said first televised event for display on said display unit, and for improving the appearance of a moving graphical image by computing a series of intermediate movements between a first position and a target position such that said image moves from said first position to said target position at varying speeds.

34. The system of claim 33 wherein said viewer inputs further include event database navigation inputs and, responsive to said event database navigation inputs, said processor selects information from said event database pertaining to events other than said first televised event and generates combined displays of said television video content for said first televised event and said information pertaining to said other events for display on said display unit.

35. The system of claim 34 wherein said events other than said first televised event are untelevised events.

36. The system of claim 33 wherein said viewer inputs further include event database navigation inputs and, responsive to said event database navigation inputs, said processor selects additional information from said event database pertaining to said first televised event and generates a combined display of said television video content for said first televised event and said additional information for display on said display unit.

37. The system of claim 33, wherein said data receiver receives updated event database information including updates to said selected information pertaining to said first televised event, and said processor updates said combined display using said updated information pertaining to said first televised event.

38. The system of claim 37 wherein said data receiver receives said updated event database information substantially in real-time.

39. The system of claim 33 further comprising memory, wherein said event database information received by said data receiver is stored in said memory and said processor selects said information pertaining to said first televised event by retrieving said information pertaining to said televised event from said memory.

40. The system of claim 33 wherein said combined display comprises a banner overlaying a portion of said television video content for said first televised event, said banner displaying said selected information pertaining to said first televised event.

41. The system of claim 33 wherein said combined display comprises a banner which displays said selected information pertaining to said first televised event, and said processor resizes said television video content for said first televised event to fit within a portion of said combined display unoccupied by said banner.

42. The system of claim 33 wherein said event database comprises statistical information pertaining to said first televised event, and said processor displays said statistical information in said combined display.

43. The system of claim 42 wherein said data receiver receives updates to said statistical information, and said processor updates said combined display using said updated statistical information.

44. The system of claim 33 wherein:
said video content receiver receives television program video content for at least one additional televised event;
said data receiver receives information pertaining to said at least one additional televised event as part of said event database, said information pertaining to said at least one televised event including channel tuning information;
said viewer inputs include event database navigation inputs and an event selection input; and
said processor, in response to said event database navigation inputs, selects information from said event database pertaining to said at least one additional televised event and generates a combined display of said television video content for said first televised event and said information pertaining to said at least one additional televised event, wherein, in response to said event selection input, said processor causes said video content receiver to provide said television video content for said at least one additional televised event for display on said display unit.

45. The system of claim 44, wherein said processor, in response to said event selection input, generates a combined display of said television program video content for said at least one additional televised program and said information pertaining to said at least one additional televised event for display on said display unit.

46. A system operable to provide a combined display of video content and information from an event database, said system comprising:

a video receiver operable to receive said video content;

a data receiver operable to receive said event database, said event database including information pertaining to a plurality of events including an event shown in said video content;

a viewer input receiver operable to receive viewer requests including a request to display said video content; and a processor operable to generate a combined display of said video content and information pertaining to said event shown in said video content; wherein:

said processor updates in substantially real-time said information in said combined display in response to an occurrence within said event.

47. The system of claim 46 wherein said video content is a television program.

48. The system of claim 46 wherein said event is a live activity selected from the group consisting of a sporting event, a political event, a judicial event, a community event, and an entertainment event.

49. The system of claim 46 wherein:

said viewer input receiver is further operable to receive a viewer request to display information pertaining to a second event not shown in said video content;

said processor is further operable to generate a combined display of said video content and said information pertaining to a second event;

said processor updates in substantially real-time said information pertaining to a second event in said combined display in response to an occurrence within said second event.

50. A method of displaying information in a combined display of video content and information, said method comprising:

receiving video content;

receiving an event database that includes information pertaining to an event;

receiving a viewer request to display said video content;

generating a combined display of said video content and said information pertaining to said event;

receiving updated event database information in substantially real-time in response to an occurrence within said event; and updating said combined display in substantially real-time with said updated information.

51. The method of claim 50 wherein said event is a live activity selected from the group consisting of a sporting event, a political event, a judicial event, a community event, and an entertainment event.

* * * * *

UNITED STATES PATENT AND TRADEMARK OFFICE
CERTIFICATE OF CORRECTION

PATENT NO : 6,049,333

DATED : April 11, 2000

INVENTOR(s) : Michael L. Lajoie, et al.

It is certified that error appears in the above-identified patent and that said Letters Patent are hereby corrected as shown below:

Column 2, line 55, "viewers'televisions" should be --viewer's televisions--.

Column 10, line 32, delete "after".

Column 11, line 2, "to-fit" should be --to fit--.

Claim 16, column 17, line 64, "The method of claim 14" should be --The method of claim 15--.

Claim 17, column 17, line 66, "The method of claim 14" should be --The method of claim 15--.

Signed and Sealed this

First Day of May, 2001

Attest:

NICHOLAS P. GODICI

Attesting Officer

Acting Director of the United States Patent and Trademark Office